(12) United States Patent
Russell

(10) Patent No.: US 9,665,094 B1
(45) Date of Patent: May 30, 2017

(54) AUTOMATICALLY DEPLOYED UAVS FOR DISASTER RESPONSE

(71) Applicant: X Development LLC, Mountain View, CA (US)

(72) Inventor: Daniel Martin Russell, Palo Alto, CA (US)

(73) Assignee: X Development LLC, Mountain View, CA (US)

(*) Notice: Subject to any disclaimer, the term of this patent is extended or adjusted under 35 U.S.C. 154(b) by 73 days.

(21) Appl. No.: 14/537,855

(22) Filed: Nov. 10, 2014

Related U.S. Application Data

(60) Provisional application No. 62/038,060, filed on Aug. 15, 2014.

(51) Int. Cl.
| | | |
|---|---|---|
| *G05D 1/00* | (2006.01) | |
| *B64C 39/02* | (2006.01) | |
| *G01P 5/00* | (2006.01) | |
| *B64D 47/08* | (2006.01) | |

(52) U.S. Cl.
CPC ............ *G05D 1/00* (2013.01); *B64C 39/024* (2013.01); *B64D 47/08* (2013.01); *G01P 5/00* (2013.01); *B64C 2201/12* (2013.01); *B64C 2201/14* (2013.01)

(58) Field of Classification Search
CPC G05D 1/00; G01P 5/00; B62C 39/024; B64C 2201/12; B64C 2201/14; B64D 47/08
See application file for complete search history.

(56) References Cited

U.S. PATENT DOCUMENTS

| | | | | |
|---|---|---|---|---|
| 5,458,490 | A  * | 10/1995 | Cabana | G09B 9/06 434/29 |
| 6,588,701 | B2 | 7/2003 | Yavnai | |
| 8,346,578 | B1 * | 1/2013 | Hopkins, III | G06Q 40/00 382/100 |
| 8,390,444 | B2 | 3/2013 | Li et al. | |
| 8,620,841 | B1 * | 12/2013 | Filson | H04L 12/1895 706/12 |
| 8,894,006 | B2 * | 11/2014 | Jones | B64F 1/06 244/63 |
| 2007/0252035 | A1 * | 11/2007 | Hubbard, Jr. | B64C 13/16 244/75.1 |
| 2008/0030884 | A1 * | 2/2008 | Hershkovitz | A01G 15/00 359/871 |

(Continued)

*Primary Examiner* — Khoi Tran
*Assistant Examiner* — Robert Nguyen
(74) *Attorney, Agent, or Firm* — McDonnell Boehnen Hulbert & Berghoff LLP

(57) ABSTRACT

Embodiments relate to a container that can be installed at a remote location, detect a disaster event, and automatically deploy a UAV. In response to detection of the disaster event, such a container may be configured to: (i) determine whether or not one or more weather conditions affecting operation of an unmanned aerial vehicle (UAV) are conducive to deployment of the UAV to fly to the first geographic area, (ii) if the one or more conditions are conducive to deployment of the UAV, then deploy the UAV to fly to the first geographic area, and (iii) if the one or more conditions are not conducive to deployment of the UAV, then monitor the second data until it is determined that the one or more conditions are conducive to deployment of the UAV, and then deploy the UAV to fly to the first geographic area.

21 Claims, 8 Drawing Sheets

(56) References Cited

U.S. PATENT DOCUMENTS

| | | | |
|---|---|---|---|
| 2009/0265206 A1* | 10/2009 | Friedlander | G06Q 10/06 706/47 |
| 2009/0326792 A1* | 12/2009 | McGrath | G01W 1/08 701/120 |
| 2010/0230968 A1* | 9/2010 | Chernyshov | F03D 5/00 290/44 |
| 2011/0024548 A1* | 2/2011 | Kuroda | B64D 1/04 244/3 |
| 2011/0046809 A1* | 2/2011 | Fickey | H02H 5/005 700/293 |
| 2011/0130636 A1 | 6/2011 | Daniel et al. | |
| 2011/0186687 A1* | 8/2011 | Elder | B64C 31/06 244/155 A |
| 2012/0050524 A1* | 3/2012 | Rinner | G06T 7/33 348/117 |
| 2012/0050525 A1* | 3/2012 | Rinner | G06T 7/0028 348/117 |
| 2012/0152654 A1* | 6/2012 | Marcus | A62B 5/00 182/129 |
| 2012/0192779 A1* | 8/2012 | Teppig, Jr. | B63H 5/07 114/256 |
| 2012/0226394 A1* | 9/2012 | Marcus | A62B 5/00 701/2 |
| 2012/0280823 A1* | 11/2012 | Yang | G08B 21/10 340/669 |
| 2012/0323528 A1 | 12/2012 | Davis et al. | |
| 2013/0306267 A1* | 11/2013 | Feldman | E02B 1/00 165/45 |
| 2013/0338962 A1 | 12/2013 | Crandall | |
| 2014/0032034 A1* | 1/2014 | Raptopoulos | G08G 5/0069 701/25 |
| 2014/0116234 A1* | 5/2014 | Jacq | F41A 23/20 89/1.11 |
| 2014/0117147 A1 | 5/2014 | Hanna et al. | |
| 2014/0117153 A1* | 5/2014 | Childress | B64F 1/04 244/63 |
| 2014/0208841 A1* | 7/2014 | Hausot | G01N 1/12 73/152.24 |
| 2014/0212986 A1* | 7/2014 | Angelescu | G01N 1/12 436/180 |
| 2014/0358442 A1* | 12/2014 | Akhlaq | G01W 1/00 702/3 |
| 2015/0077737 A1* | 3/2015 | Belinsky | G01N 21/53 356/51 |
| 2015/0112906 A1* | 4/2015 | Gauthier | G06N 7/00 706/13 |
| 2015/0175278 A1* | 6/2015 | Hunter | F41F 3/04 244/158.5 |
| 2015/0252777 A1* | 9/2015 | Rhinefrank | F03B 13/14 290/53 |
| 2015/0336667 A1* | 11/2015 | Srivastava | B64C 39/024 701/2 |
| 2015/0336685 A1* | 11/2015 | Wan | B64G 1/005 244/2 |
| 2015/0373735 A1* | 12/2015 | Thubert | H04W 4/22 370/310.1 |
| 2015/0379874 A1* | 12/2015 | Ubhi | G01S 5/0027 701/3 |
| 2016/0071379 A1* | 3/2016 | McKiel, Jr. | G08B 5/36 340/691.6 |
| 2016/0217381 A1* | 7/2016 | Bloomquist | G06N 5/02 |
| 2016/0337441 A1* | 11/2016 | Bloomquist et al. | G06Q 10/10 |
| 2016/0369919 A1* | 12/2016 | Peters | F16L 11/086 |

\* cited by examiner

AUTOMATICALLY DEPLOYED UAVS FOR DISASTER RESPONSE

RELATED APPLICATION

This application claims priority to U.S. Provisional App. No. 62/038,060, filed Aug. 15, 2014, entitled "Automatically Deployed UAVs for Disaster Response", the contents of which are incorporated by reference herein for all purposes.

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Unmanned aerial vehicles (UAVs) may be useful in disaster situations. For instance, when a hurricane earthquake occurs, UAVs may be deployed to capture photos and/or video, support communications, and obtain other types of data, more quickly and/or safely than might otherwise be possible. Accordingly, example embodiments may provide a container that can be installed within or near to a given area, which includes a computing system, communication systems, and/or sensors, which allow the container to detect when a disaster event occurs in the area. The container may also function as a housing for a UAV, which can be arranged in the container when the container is installed in the given area. Accordingly, the container may monitor sensor data for indications of a disaster event, and responsively launch its UAV when a disaster event is detected.

Further, an example container may intelligently time the automated deployment of its UAV. More specifically, once a disaster event is detected, the container may monitor conditions that affect the operation of the UAV, and delay the launch until conditions are appropriate. For example, when a high-wind-speed disaster such as a hurricane is detected, it may be undesirable to launch the UAV while hurricane-force winds still exist, as such winds may prevent the UAV from flying a predetermined flight path, or potentially even cause the UAV to crash. Accordingly, after detecting a hurricane, the container may monitor wind-speed data, and launch its UAV as soon as wind speeds die down enough, that flight is considered safe. Other examples are also possible.

In one aspect, a computer-implemented method involves: (i) receiving first data corresponding to a first geographic area; (ii) based at least in part on analysis of the first data, detecting an occurrence of a disaster event at the first geographic area; and (iii) in response to detection of the disaster event: (a) determining, based on second data, whether or not one or more weather conditions affecting operation of a UAV are conducive to deployment of the UAV to fly to the first geographic area; (b) if the one or more conditions are conducive to deployment of the UAV, then deploying the UAV to fly to the first geographic area; and (c) if the one or more conditions are not conducive to deployment of the UAV, then monitoring the second data until it is determined that the one or more conditions are conducive to deployment of the UAV, and then deploying the UAV to fly to the first geographic area.

In another aspect, a computer-implemented method involves: (i) receiving, at a control system for a UAV deployment system, sensor data corresponding to a first geographic area, wherein the sensor data comprises first wind data; (ii) based at least in part on the sensor data, detecting a disaster event at the first geographic area, wherein the disaster event is of a type associated with high wind speed; and (iii) in response to detecting the disaster event, the control system: (a) receiving second wind data corresponding to at least one potential flight path; (b) determining, based at least in part on the second wind data, whether or not weather conditions associated with the at least one potential flight path are conducive to deployment of a UAV to fly to the first geographic area; (c) if the weather conditions are conducive to deployment of the UAV, then deploying the UAV to fly to the first geographic area; and (d) if the weather conditions are not conducive to deployment of the UAV, then monitoring the second wind data until it is determined that the one or more wind parameters are conducive to deployment of the UAV to fly to the first geographic area, and then deploying the UAV to fly to the first geographic area.

In a further aspect, an apparatus includes: an unmanned aerial vehicle, a container configured to at least partially enclose the unmanned aerial vehicle, and a control system. The control system is operable to: (i) receive sensor data corresponding to a first geographic area; (ii) based at least in part on the sensor data, detect an occurrence of a disaster event at the first geographic area, wherein the disaster event is of a type associated with high wind speed; and (iii) in response to detection of the disaster event: (a) receive wind data indicating one or more wind parameters corresponding to a potential flight-path area; (b) determine whether or not the one or more wind parameters are conducive to deployment of the UAV to fly to the first geographic area; (c) if the one or more wind parameters are conducive to deployment of the UAV, then deploy the UAV to fly to the first geographic area; and (d) if the one or more wind parameters are not conducive to deployment of the UAV, then monitor the wind data until it is determined that the one or more wind parameters are conducive to deployment of the UAV to fly to the first geographic area, and then deploy the UAV to fly to the first geographic area.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 4 is a simplified block diagram illustrating a network of unmanned aerial vehicles, according to an example embodiment.

DETAILED DESCRIPTION

Figure 1:
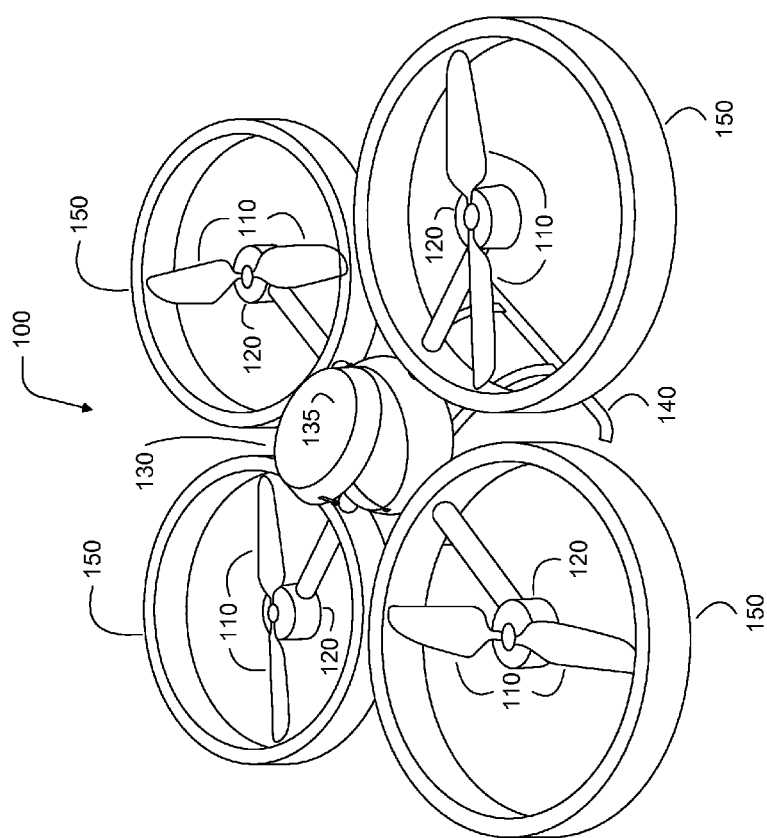
FIGS. 1, 2, 3, and 4 are simplified illustrations of unmanned aerial vehicles, according to example embodiments.

The following detailed description describes various features and functions of the disclosure with reference to the accompanying Figures. In the Figures, similar symbols typically identify similar components, unless context dictates otherwise. The illustrative apparati described herein are not meant to be limiting. It will be readily understood that certain aspects of the disclosure can be arranged and combined in a wide variety of different configurations, all of which are contemplated herein.

I. Overview

Natural disasters, such as earthquakes, hurricanes, tsunamis, rock slides, forest fires, and tropical storms can cause a great deal of damage, and can result in loss of human life. Other non-natural disasters, such as building fires, some forest fires, a building collapsing, and a terrorist attack, can similarly cause damage and loss of life. In some cases, the amount of damage and/or loss of life that results from a disaster can be reduced through improved response systems.

For instance, quickly obtaining image data and/or other types of information from a disaster area may help to prevent the resulting amount of damage and/or reduce any resulting loss of life. As a specific example, real-time images from an affected location would be of significant value to groups that are planning relief efforts. Such images could help to locate victims in need of aid and/or help disaster-response personnel more quickly target relief efforts and more efficiently use their resources. However, in many cases, it can be difficult to get accurate and timely data and information feeds from a location where a disaster has just occurred (or is still in the process of occurring).

Example embodiments may help to improve relief and rescue efforts by allowing for data to be more quickly be provided from a location where a disaster has occurred. In particular, an example system may include an unmanned aerial vehicle (UAV), such as a drone, as well as a control system that can detect the occurrence of a disaster event and automatically deploy the UAV in response to detection of the disaster. The UAV, the control system, and possibly other components, may all be combined in a self-contained system that can be easily installed at remote locations.

Once deployed, the UAV may be pre-programmed to fly in particular path around the area that is believed to have been affected by a disaster, and to obtain and send telemetry data, image data, and/or other sensor data to appropriate recipients (e.g., relief groups, government entities, etc.). The UAV may collect various types of data related to a disaster event. Examples of such data include, but are not limited to: (i) video and/or still images, (ii) infrared (IR) imagery (e.g., which could be analyzed to show hotspots or patterns of forest fires), (iii) audio data (including, e.g., directional audio data), (iv) data collected by a particular matter detector (e.g., by a smoke detector), and/or (v) spectral data from a Raman spectrometer (which could indicate, e.g., what type of material is burning in a fire).

In some cases, the weather conditions that occur during some disaster events may not be conducive to flight by a UAV. Accordingly, in a further aspect, once a disaster event is detected, an example container may intelligently time the automated deployment of its UAV. In particular, the container may monitor conditions (e.g., weather conditions) that affect the operation of the UAV, and delay the launch until conditions are appropriate.

Various types of conditions can affect the ability of a UAV to take off, execute a flight plan, acquire data during flight, and/or land. Accordingly, a control system at an example container may be configured to analyze various types of conditions affecting operation of a UAV when determining the appropriate timing with which to launch a UAV. As an example, when a hurricane or tornado is detected, an example method may be particularly useful, as it may not be feasible to fly a UAV into a hurricane due to the high winds. However, if the UAV is launched as soon as the hurricane-force winds subside to a point where UAV flight is feasible, the UAV may still be able to provide valuable data more quickly than would otherwise be possible. Other examples of conditions affecting flight by a UAV are also possible.

As another example, precipitation such as rain, sleet, or snow may be undesirable for UAV flight. Accordingly, after detecting a disaster event, such as a tropical storm, an example UAV deployment container may monitor rain that accompanies the tropical storm, and wait for rain to subside before deploying its UAV.

In yet another example, fog or smoke may be undesirable for data collection by a UAV (e.g., by preventing the UAV from capturing aerial images over a disaster area). Accordingly, after detecting a disaster event, such as a forest fire or an earthquake, an example UAV deployment container may monitor, e.g., the amount of particulate and/or moisture in the air, light intensity levels, and/or other data that is indicative of fog, smoke, or haze. If such data indicates that there is insufficient visibility for aerial imaging, then the container may wait for fog or smoke to subside to a point where aerial imaging is feasible, before deploying its UAV. Other examples of conditions affecting flight by a UAV are also possible.

II. Unmanned Aerial Vehicles

Herein, the terms "unmanned aerial vehicle" and "UAV" refer to any autonomous or semi-autonomous vehicle that is capable of performing some functions without a physically-present human pilot. Examples of flight-related functions may include, but are not limited to, sensing its environment or operating in the air without a need for input from an operator, among others.

A UAV may be autonomous or semi-autonomous. For instance, some functions could be controlled by a remote human operator, while other functions are carried out autonomously. Further, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from the city hall in Palo Alto to the city hall in San Francisco), while the UAV's navigation system autonomously controls more fine-grained navigation decisions, such as the specific route to take between the two locations, specific flight controls to achieve the route and avoid obstacles while navigating the route, and so on. Other examples are also possible.

A UAV can be of various forms. For example, a UAV may take the form of a rotorcraft such as a helicopter or multi-copter, a fixed-wing aircraft, a jet aircraft, a ducted fan aircraft, a lighter-than-air dirigible such as a blimp or steerable balloon, a tail-sitter aircraft, a glider aircraft, and/or an ornithopter, among other possibilities. Further, the terms "drone", "unmanned aerial vehicle system" ("UAVS"), or "unmanned aerial system" ("UAS") may also be used to refer to a UAV.

FIG. 1 is a simplified illustration of a UAV, according to an example embodiment. In particular, FIG. 1 shows an example of a rotorcraft 100 that is commonly referred to as a multicopter. Multicopter 100 may also be referred to as a quadcopter, as it includes four rotors 110. It should be understood that example embodiments may involve rotorcraft with more or less rotors than multicopter 100. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 100 in greater detail, the four rotors 110 provide propulsion and maneuverability for the multicopter 100. More specifically, each rotor 110 includes blades that are attached to a motor 120. Configured as such the rotors may allow the multicopter 100 to take off and land vertically, to maneuver in any direction, and/or to hover. Furthermore, the pitch of the blades may be adjusted as a group and/or differentially, and may allow a multicopter 100 to perform three-dimensional aerial maneuvers such as an upside-down hover, a continuous tail-down "tic-toc," loops, loops with pirouettes, stall-turns with pirouette, knife-edge, immelmann, slapper, and traveling flips, among others. When the pitch of all blades is adjusted to perform such aerial maneuvering, this may be referred to as adjusting the "collective pitch" of the multicopter 100. Blade-pitch adjustment may be particularly useful for rotorcraft with substantial inertia in the rotors and/or drive train, but is not limited to such rotorcraft.

Additionally or alternatively, multicopter 100 may propel and maneuver itself by adjusting the rotation rate of the motors, collectively or differentially. This technique may be particularly useful for small electric rotorcraft with low inertia in the motors and/or rotor system, but is not limited to such rotorcraft.

Multicopter 100 also includes a central enclosure 130 with a hinged lid 135. The central enclosure may contain, e.g., control electronics such as an inertial measurement unit (IMU) and/or an electronic speed controller, batteries, other sensors, and/or a payload, among other possibilities.

The illustrative multicopter 100 also includes landing gear 140 to assist with controlled take-offs and landings. In other embodiments, multicopters and other types of UAVs without landing gear are also possible.

In a further aspect, multicopter 100 includes rotor protectors 150. Such rotor protectors 150 can serve multiple purposes, such as protecting the rotors 110 from damage if the multicopter 100 strays too close to an object, protecting the multicopter 100 structure from damage, and protecting nearby objects from being damaged by the rotors 110. It should be understood that in other embodiments, multicopters and other types of UAVs without rotor protectors are also possible. Further, rotor protectors of different shapes, sizes, and function are possible, without departing from the scope of the invention.

A multicopter 100 may control the direction and/or speed of its movement by controlling its pitch, roll, yaw, and/or altitude. To do so, multicopter 100 may increase or decrease the speeds at which the rotors 110 spin. For example, by maintaining a constant speed of three rotors 110 and decreasing the speed of a fourth rotor, the multicopter 100 can roll right, roll left, pitch forward, or pitch backward, depending upon which motor has its speed decreased. Specifically, the multicopter may roll in the direction of the motor with the decreased speed. As another example, increasing or decreasing the speed of all rotors 110 simultaneously can result in the multicopter 100 increasing or decreasing its altitude, respectively. As yet another example, increasing or decreasing the speed of rotors 110 that are turning in the same direction can result in the multicopter 100 performing a yaw-left or yaw-right movement. These are but a few examples of the different types of movement that can be accomplished by independently or collectively adjusting the RPM and/or the direction that rotors 110 are spinning.

Figure 2:
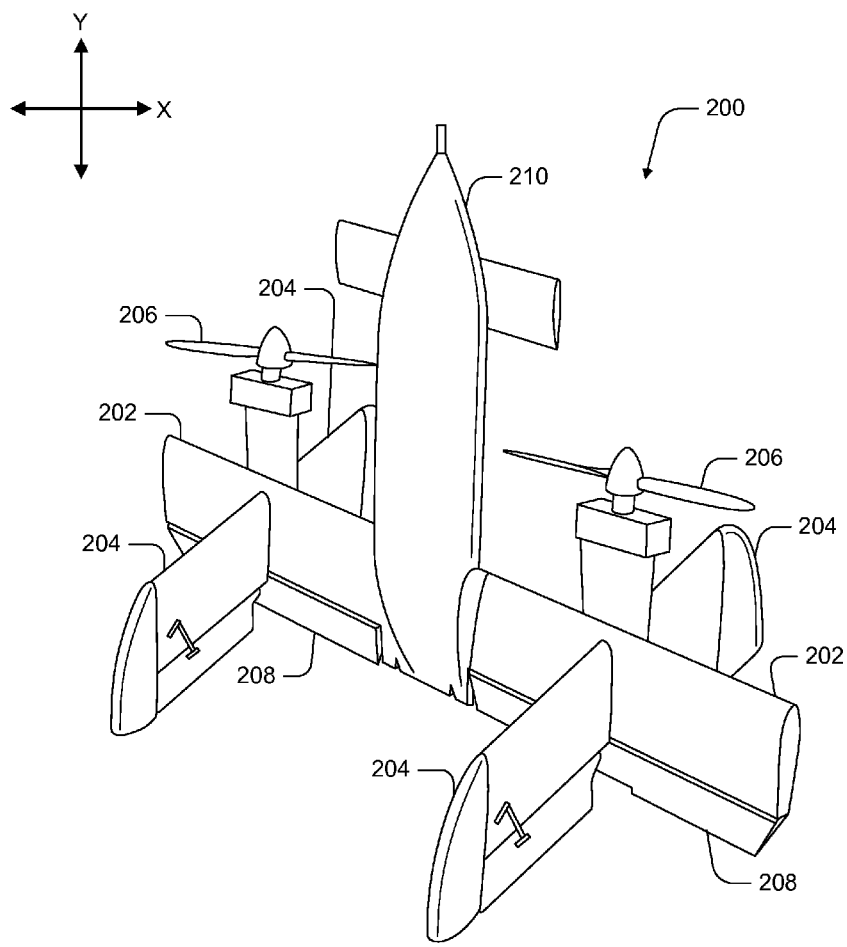

FIG. 2 is a simplified illustration of a UAV, according to an example embodiment. In particular, FIG. 2 shows an example of a tail-sitter UAV 200. In the illustrated example, the tail-sitter UAV 200 has fixed wings 202 to provide lift and allow the UAV to glide horizontally (e.g., along the x-axis, in a position that is approximately perpendicular to the position shown in FIG. 2). However, the fixed wings 202 also allow the tail-sitter UAV 200 take off and land vertically on its own.

For example, at a launch site, tail-sitter UAV 200 may be positioned vertically (as shown) with fins 204 and/or wings 202 resting on the ground and stabilizing the UAV in the vertical position. The tail-sitter UAV 200 may then take off by operating propellers 206 to generate the upward thrust (e.g., a thrust that is generally along the y-axis). Once at a suitable altitude, the tail-sitter UAV 200 may use its flaps 208 to reorient itself in a horizontal position, such that the fuselage 210 is closer to being aligned with the x-axis than the y-axis. Positioned horizontally, the propellers 206 may provide forward thrust so that the tail-sitter UAV 200 can fly in a similar manner as a typical airplane.

Variations on the illustrated tail-sitter UAV 200 are possible. For instance, tail-sitters UAVs with more or less propellers, or that utilize a ducted fan or multiple ducted fans, are also possible. Further, different wing configurations with more wings (e.g., an "x-wing" configuration with four wings), with less wings, or even with no wings, are also possible. More generally, it should be understood that other types of tail-sitter UAVs and variations on the illustrated tail-sitter UAV 200 are also possible.

As noted above, some embodiments may involve other types of UAVs, in addition or in the alternative to multi-copters. For instance, FIGS. 3 and 4 are simplified illustrations of other types of UAVs, according to example embodiments.

Figure 3:
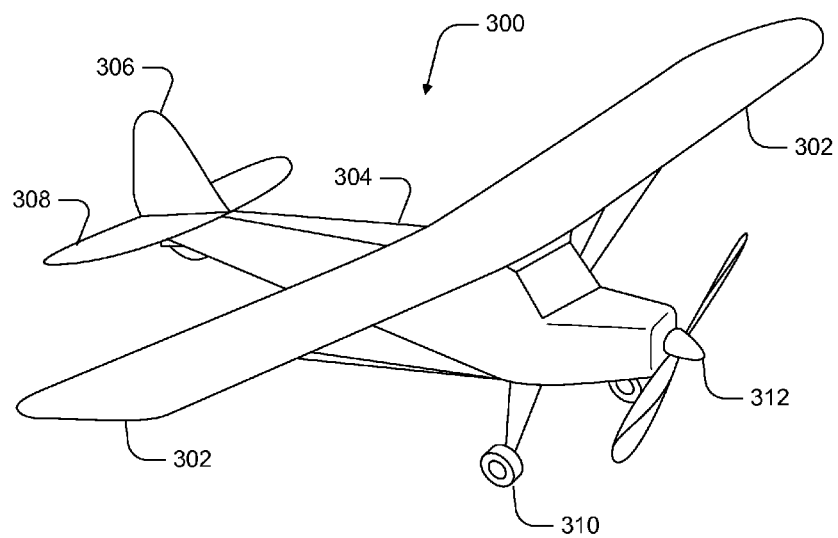

In particular, FIG. 3 shows an example of a fixed-wing aircraft 300, which may also be referred to as an airplane, an aeroplane, or simply a plane. A fixed-wing aircraft 300, as the name implies, has stationary wings 302 that generate lift based on the wing shape and the vehicle's forward airspeed. This wing configuration is different from a rotorcraft's configuration, which produces lift through rotating rotors about a fixed mast, and an ornithopter's configuration, which produces lift by flapping wings.

FIG. 3 depicts some common structures used in a fixed-wing aircraft 300. In particular, fixed-wing aircraft 300 includes a fuselage 304, two horizontal wings 302 with an airfoil-shaped cross section to produce an aerodynamic force, a vertical stabilizer 306 (or fin) to stabilize the plane's yaw (turn left or right), a horizontal stabilizer 308 (also referred to as an elevator or tailplane) to stabilize pitch (tilt up or down), landing gear 310, and a propulsion unit 312, which can include a motor, shaft, and propeller.

Figure 4:
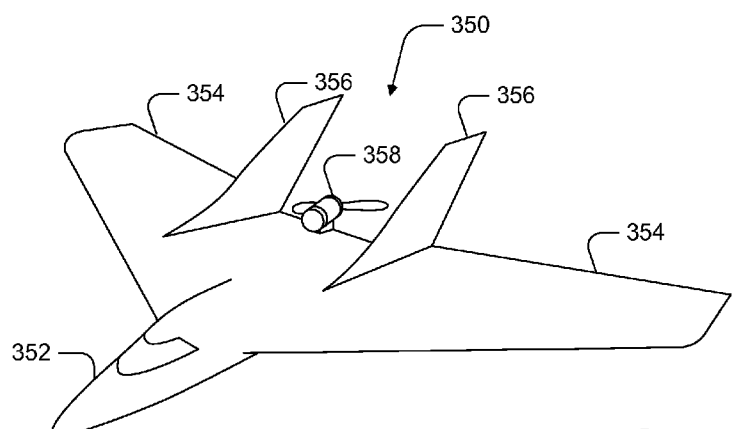

FIG. 4 shows an example of an aircraft 350 with a propeller in a pusher configuration. The term "pusher" refers to the fact that the propulsion unit 358 is mounted at the back of the aircraft and "pushes" the vehicle forward, in contrast to the propulsion unit being mounted at the front of the aircraft. Similar to the description provided for FIG. 3, FIG. 4 depicts common structures used in the pusher plane: a fuselage 352, two horizontal wings 354, vertical stabilizers 356, and a propulsion unit 358, which can include a motor, shaft, and propeller.

UAVs can be launched in various ways, using various types of launch systems (which may also be referred to as deployment systems). A very simple way to launch a UAV is a hand launch. To perform a hand launch, a user holds a portion of the aircraft, preferably away from the spinning rotors, and throws the aircraft into the air while contemporaneously throttling the propulsion unit to generate lift.

Rather than using a hand launch procedure in which the person launching the vehicle is exposed to risk from the quickly spinning propellers, a stationary or mobile launch station can be utilized. For instance, a launch system can include supports, angled and inclined rails, and a backstop. The aircraft begins the launch system stationary on the angled and inclined rails and launches by sufficiently increasing the speed of the propeller to generate forward airspeed along the incline of the launch system. By the end of the angled and inclined rails, the aircraft can have sufficient airspeed to generate lift. As another example, a launch system may include a rail gun or cannon, either of which may launch a UAV by thrusting the UAV into flight. A launch system of this type may launch a UAV quickly and/or may launch a UAV far towards the UAV's destination. Other types of launch systems may also be utilized.

In some cases, there may be no separate launch system for a UAV, as a UAV may be configured to launch itself. For example, a "tail sitter" UAV typically has fixed wings to provide lift and allow the UAV to glide, but also is configured to take off and land vertically on its own. Other examples of self-launching UAVs are also possible.

In a further aspect, various other types of unmanned vehicles may be utilized to provide remote medical support. Such vehicles may include, for example, unmanned ground vehicles (UGVs), unmanned space vehicles (USVs), and/or unmanned underwater vehicles (UUVs). A UGV may be a vehicle which is capable of sensing its own environment and navigating surface-based terrain without input from a driver. Examples of UGVs include watercraft, cars, trucks, buggies, motorcycles, treaded vehicles, and retrieval duck decoys, among others. A UUV is a vehicle that is capable of sensing its own environment and navigating underwater on its own, such as a submersible vehicle. Other types of unmanned vehicles are possible as well.

Figure 5:
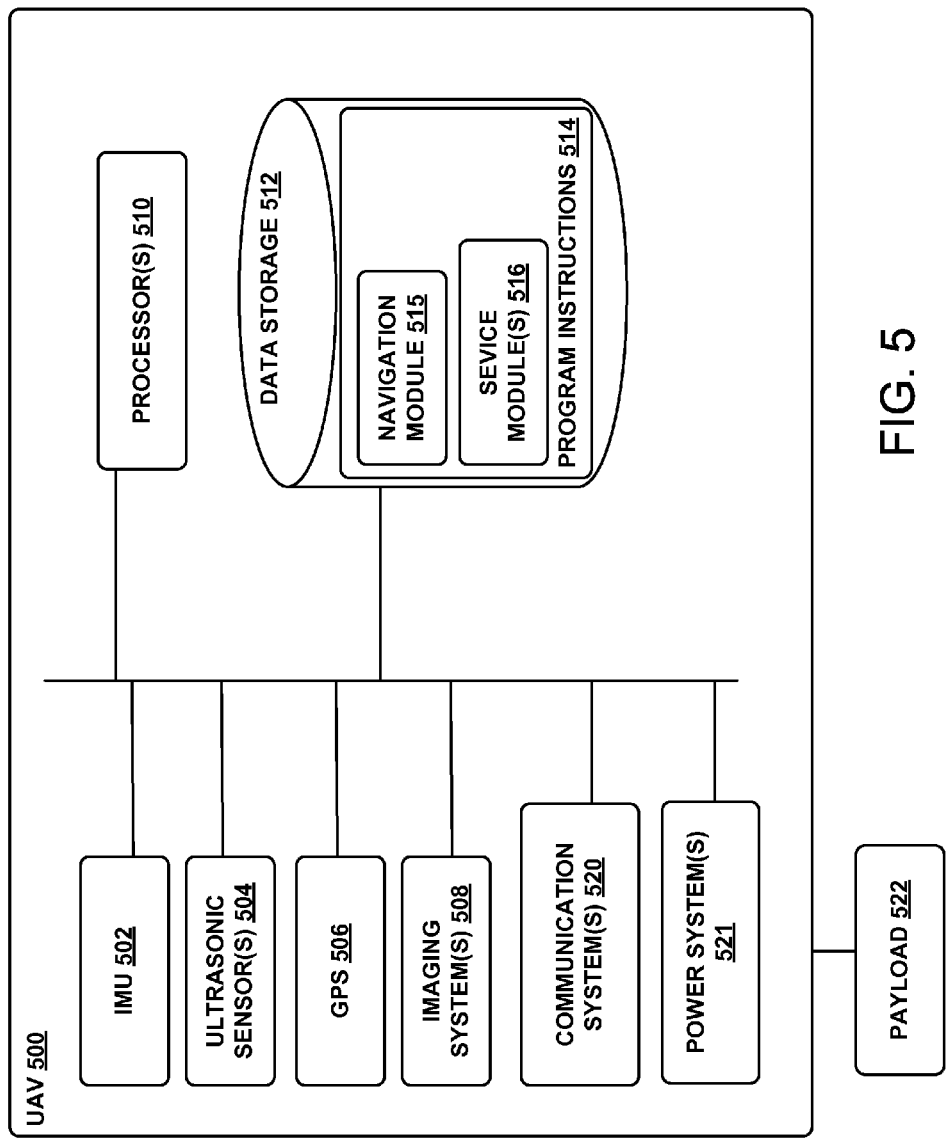
FIG. 5 is a simplified block diagram illustrating components of an unmanned aerial vehicle, according to an example embodiment.

FIG. 5 is a simplified block diagram illustrating components of a UAV 500, according to an example embodiment. UAV 500 may take the form of or be similar in form to one of the UAVs 100, 200, 300, and 350 shown in FIGS. 1, 2, 3, and 4. However, a UAV 500 may also take other forms.

UAV 500 may include various types of sensors, and may include a computing system configured to provide the functionality described herein. In the illustrated embodiment, the sensors of UAV 500 include an inertial measurement unit (IMU) 502, ultrasonic sensor(s) 504, GPS 506, imaging system(s) 508, among other possible sensors and sensing systems.

In the illustrated embodiment, UAV 500 also includes one or more processors 510. A processor 510 may be a general-purpose processor or a special purpose processor (e.g., digital signal processors, application specific integrated circuits, etc.). The one or more processors 510 can be configured to execute computer-readable program instructions 514 that are stored in the data storage 512 and are executable to provide the functionality of a UAV described herein.

The data storage 512 may include or take the form of one or more computer-readable storage media that can be read or accessed by at least one processor 510. The one or more computer-readable storage media can include volatile and/or non-volatile storage components, such as optical, magnetic, organic or other memory or disc storage, which can be integrated in whole or in part with at least one of the one or more processors 510. In some embodiments, the data storage 512 can be implemented using a single physical device (e.g., one optical, magnetic, organic or other memory or disc storage unit), while in other embodiments, the data storage 512 can be implemented using two or more physical devices.

As noted, the data storage 512 can include computer-readable program instructions 514 and perhaps additional data, such as diagnostic data of the UAV 500. As such, the data storage 514 may include program instructions to perform or facilitate some or all of the UAV functionality described herein. For instance, in the illustrated embodiment, program instructions 514 include a navigation module 515 and one or more service modules 516.

A. Sensors

In an illustrative embodiment, IMU 502 may include both an accelerometer and a gyroscope, which may be used together to determine the orientation of the UAV 500. In particular, the accelerometer can measure the orientation of the vehicle with respect to earth, while the gyroscope measures the rate of rotation around an axis. IMUs are commercially available in low-cost, low-power packages. For instance, an IMU 502 may take the form of or include a miniaturized MicroElectroMechanical System (MEMS) or a NanoElectroMechanical System (NEMS). Other types of IMUs may also be utilized.

An IMU 502 may include other sensors, in addition to accelerometers and gyroscopes, which may help to better determine position and/or help to increase autonomy of the UAV 500. Two examples of such sensors are magnetometers and pressure sensors. Other examples are also possible. (Note that a UAV could also include such additional sensors as separate components from an IMU.)

While an accelerometer and gyroscope may be effective at determining the orientation of the UAV 500, slight errors in measurement may compound over time and result in a more significant error. However, an example UAV 500 may be able mitigate or reduce such errors by using a magnetometer to measure direction. One example of a magnetometer is a low-power, digital 3-axis magnetometer, which can be used to realize an orientation independent electronic compass for accurate heading information. However, other types of magnetometers may be utilized as well.

UAV 500 may also include a pressure sensor or barometer, which can be used to determine the altitude of the UAV 500. Alternatively, other sensors, such as sonic altimeters or radar altimeters, can be used to provide an indication of altitude, which may help to improve the accuracy of and/or prevent drift of an IMU.

In a further aspect, UAV 500 may include one or more sensors that allow the UAV to sense objects in the environment. For instance, in the illustrated embodiment, UAV 500 includes ultrasonic sensor(s) 504. Ultrasonic sensor(s) 504 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

UAV 500 also includes a GPS receiver 506. The GPS receiver 506 may be configured to provide data that is typical of well-known GPS systems, such as the GPS coordinates of the UAV 500. Such GPS data may be utilized by the UAV 500 for various functions. As such, the UAV may use its GPS receiver 506 to help navigate to the caller's location, as indicated, at least in part, by the GPS coordinates provided by their mobile device. Other examples are also possible.

UAV 500 may also include one or more imaging system(s) 508. For example, one or more still and/or video cameras may be utilized by a UAV 500 to capture image data from the UAV's environment. As a specific example, charge-coupled device (CCD) cameras or complementary metal-oxide-semiconductor (CMOS) cameras can be used with unmanned vehicles. Such imaging sensor(s) 508 have numerous possible applications, such as obstacle avoidance, localization techniques, ground tracking for more accurate navigation (e.g., by applying optical flow techniques to images), video feedback, and/or image recognition and processing, among other possibilities.

In a further aspect, UAV 500 may use its one or more imaging system 508 to help in determining location. For example, UAV 500 may capture imagery of its environment and compare it to what it expects to see in its environment given current estimated position (e.g., its current GPS coordinates), and refine its estimate of its position based on this comparison.

In a further aspect, UAV 500 may include one or more microphones. Such microphones may be configured to capture sound from the UAVs environment.

B. Navigation and Location Determination

The navigation module 515 may provide functionality that allows the UAV 500 to, e.g., move about in its environment and reach a desired location. To do so, the navigation module 515 may control the altitude and/or direction of flight by controlling the mechanical features of the UAV that affect flight (e.g., rotors 110 of UAV 100).

In order to navigate the UAV 500 to a target location, a navigation module 515 may implement various navigation techniques, such as map-based navigation and localization-based navigation, for instance. With map-based navigation, the UAV 500 may be provided with a map of its environment, which may then be used to navigate to a particular location on the map. With localization-based navigation, the UAV 500 may be capable of navigating in an unknown environment using localization. Localization-based navigation may involve a UAV 500 building its own map of its environment and calculating its position within the map and/or the position of objects in the environment. For example, as a UAV 500 moves throughout its environment, the UAV 500 may continuously use localization to update its map of the environment. This continuous mapping process may be referred to as simultaneous localization and mapping (SLAM). Other navigation techniques may also be utilized.

In some embodiments, the navigation module 515 may navigate using a technique that relies on waypoints. In particular, waypoints are sets of coordinates that identify points in physical space. For instance, an air-navigation waypoint may be defined by a certain latitude, longitude, and altitude. Accordingly, navigation module 515 may cause UAV 500 to move from waypoint to waypoint, in order to ultimately travel to a final destination (e.g., a final waypoint in a sequence of waypoints).

In a further aspect, navigation module 515 and/or other components and systems of UAV 500 may be configured for "localization" to more precisely navigate to the scene of a medical situation. More specifically, it may be desirable in certain situations for a UAV to be close to the person to whom an item is being delivered by a UAV (e.g., within reach of the person). To this end, a UAV may use a two-tiered approach in which it uses a more-general location-determination technique to navigate to a target location or area that is associated with the medical situation, and then use a more-refined location-determination technique to identify and/or navigate to the target location within the general area.

For example, a UAV 500 may navigate to the general area of a person to whom an item is being delivered using waypoints. Such waypoints may be pre-determined based on GPS coordinates provided by a remote device at the target delivery location. The UAV may then switch to a mode in which it utilizes a localization process to locate and travel to a specific location of the person in need. For instance, if a person is having a heart attack at a large stadium, a UAV 500 carrying a medical package may need to be within reach of the person or someone near the person so that the can take items from the package. However, a GPS signal may only get a UAV so far, e.g., to the stadium. A more precise location-determination technique may then be used to find the specific location of the person within the stadium.

Various types of location-determination techniques may be used to accomplish localization of a person or a device once a UAV 500 has navigated to the general area of the person or device. For instance, a UAV 500 may be equipped with one or more sensory systems, such as, for example, imaging system(s) 508, a directional microphone array (not shown), ultrasonic sensors 504, infrared sensors (not shown), and/or other sensors, which may provide input that the navigation module 515 utilizes to navigate autonomously or semi-autonomously to the specific location of a person.

As another example, once the UAV 500 reaches the general area of a target delivery location (or of a moving subject such as a person or their mobile device), the UAV 500 may switch to a "fly-by-wire" mode where it is controlled, at least in part, by a remote operator, who can navigate the UAV 500 to the specific location of the person in need. To this end, sensory data from the UAV 500 may be sent to the remote operator to assist them in navigating the UAV to the specific location. For example, the UAV 500 may stream a video feed or a sequence of still images from the UAV's imaging system(s) 508. Other examples are possible.

As yet another example, the UAV 500 may include a module that is able to signal to a passer-by for assistance in either reaching the specific target delivery location; for example, a UAV may displaying a visual message requesting such assistance in a graphic display, play an audio message or tone through speakers to indicate the need for such assistance, among other possibilities. Such a visual or audio message might indicate that assistance is needed in delivering the UAV 500 to a particular person or a particular location, and might provide information to assist the passer-by in delivering the UAV 500 to the person or location (e.g., a description or picture of the person or location, and/or the person or location's name), among other possibilities. Such a feature can be useful in a scenario in which the UAV is unable to use sensory functions or another location-determination technique to determine the specific location of the person. However, this feature is not limited to such scenarios.

In some embodiments, once a UAV 500 arrives at the general area of a person who requested service and/or at the general area that includes a target delivery location, the UAV may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., an RF signal, a light signal and/or an audio signal). In this scenario, the UAV may be configured to navigate by "sourcing" such directional signals—in other words, by determining where the signal is strongest and navigating accordingly. As another example, a mobile device can emit a frequency, either in the human range or outside the human range, and the UAV can listen for that frequency and navigate accordingly. As a related example, if the UAV is listening for spoken commands, then the UAV could utilize spoken statements, such as "Help! I'm over here!" to source the specific location of the person in need of medical assistance.

In an alternative arrangement, a navigation module may be implemented at a remote computing device, which communicates wirelessly with the UAV. The remote computing device may receive data indicating the operational state of the UAV, sensor data from the UAV that allows it to assess the environmental conditions being experienced by the UAV, and/or location information for the UAV. Provided with such information, the remote computing device may determine altitudinal and/or directional adjustments that should be made by the UAV and/or may determine how the UAV should adjust its mechanical features (e.g., rotors 110 of UAV 100) in order to effectuate such movements. The remote computing system may then communicate such adjustments to the UAV so it can move in the determined manner.

C. Communication Systems

In a further aspect, UAV 500 includes one or more communication systems 520. The communications systems 520 may include one or more wireless interfaces and/or one or more wireline interfaces, which allow UAV 500 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In an example embodiment, a UAV 500 may include communication systems 520 that allow for both short-range communication and long-range communication. For example, the UAV 500 may be configured for short-range communications using Bluetooth and for long-range communications under a CDMA protocol. In such an embodiment, the UAV 500 may be configured to function as a "hot spot;" or in other words, as a gateway or proxy between a remote support device and one or more data networks, such as cellular network and/or the Internet. Configured as such, the UAV 500 may facilitate data communications that the remote support device would otherwise be unable to perform by itself.

For example, UAV 500 may provide a WiFi connection to a remote device, and serve as a proxy or gateway to a cellular service provider's data network, which the UAV might connect to under an LTE or a 3G protocol, for instance. The UAV 500 could also serve as a proxy or gateway to a high-altitude balloon network, a satellite network, or a combination of these networks, among others, which a remote device might not be able to otherwise access.

D. Power Systems

In a further aspect, UAV 500 may include power system(s) 521. A power system 521 may include one or more batteries for providing power to the UAV 500. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payloads

A UAV 500 may employ various systems and configurations in order to transport items. In the illustrated embodiment, a payload 522 may serve as a compartment that can hold one or more items, such that a UAV 500 can deliver the one or more items to a target delivery location. For example, as shown in FIG. 1, a UAV 100 can include a compartment 135, in which an item or items may be transported. As another example, the UAV can include a pick-and-place mechanism, which can pick up and hold the item while the UAV is in flight, and then release the item during or after the UAV's descent. As yet another example, a UAV could include an air-bag drop system, a parachute drop system, and/or a winch system that is operable from high above a medical situation to drop or lower an item or items to the scene of the medical situation. Other examples are also possible. In some implementations, the payload 522 of a given UAV 500 may include or take the form of a "package" designed to transport medical-support items to a target delivery location. For example, a medical-support UAV may include a package with one or more items for medical support in the particular medical situation, and/or one or more medical-support modules 516 that are designed to provide medical support in the particular medical situation. In some cases, a UAV 500 may include a package that is designed for a particular medical situation such as choking, cardiac arrest, shock, asthma, drowning, etc. In other cases, a UAV 500 may include a package that is designed for a number of different medical situations, which may be associated in some way.

Such medical support items may aid in diagnosing and/or treating a person who needs medical assistance, or may serve other purposes. Example of medical-support items include, but are not limited to: (a) medicines, (b) diagnostic devices, such as a pulse oximeter, blood pressure sensor, or EKG sensor, (c) treatment devices, such as an EpiPen, a first aid kit, or various kinds of defibrillators (e.g., an automated external defibrillator (AED)), and/or (d) remote support devices, such as a mobile phone or a head-mountable device (HMD), among other possibilities. Note that some items that are electronic may include one or more batteries to provide power to the item. These batteries may be rechargeable and may be recharged using one or more wired or wireless charging systems. In addition or on in the alternative, an item may be integrated with one or more batteries in the power system 521 for power.

In some embodiments, a UAV 500 could include an integrated system or device for administering or assisting in the administration of medical care (e.g., a system or device having one or more components that are built in to the structure of the UAV itself). For example, as noted above, a UAV could include an oxygen-therapy system. In an example configuration, an oxygen-therapy system might include a mask that is connected via tubing to an on-board oxygen source. Configured as such, the UAV could release the oxygen mask when it reaches a person in need of oxygen (e.g., at a fire scene).

As another example of a UAV with an integrated medical-support device, a UAV 500 might function as a mobile defibrillator. Specifically, rather than carry a stand-alone defibrillator that can then be removed from the UAV for use, the UAV itself may function as a defibrillator.

F. Service Modules

As noted above, UAV 500 may include one or more service modules 916. The one or more service modules 516 include software, firmware, and/or hardware that may help to provide or assist in the provision of the UAV-related services.

Configured as such, a UAV 500 may provide various types of service. For instance, a UAV 500 may have stored information that can be provided to a person or persons at the target location, in order to assist the person or persons in various ways. For example, a UAV may include a video or audio file with instructions for performing some task, which the UAV can play out to a person at the target location. As another example, a UAV may include an interactive program to assist a person at the target location in performing some task. For instance, a UAV may include an application that analyzes the person's speech to detect questions related to the medical situation and/or that provides a text-based interface via which the person can ask such questions, and then determines and provides answers to such questions.

In some embodiments, a UAV 500 may facilitate communication between a layperson and/or medical personnel at the scene and medical personnel at a remote location. As an example, a service module 516 may provide a user interface via which a person at the scene can use a communication system 520 of the UAV to communicate with an emergency medical technician at a remote location. As another example, the UAV 500 can unlock certain capabilities of a remote device, such as a mobile phone, which is near the UAV at the scene of a medical situation. Such capabilities may be inaccessible to a user of the remote device, unless the remote device is within a certain distance from the UAV such that the UAV can unlock the capabilities. For example, a UAV may send the remote device a security key that allows the remote device to establish a secure connection to communicate with medical personnel at a remote location. Other examples are also possible.

III. Illustrative Apparatus

In an example embodiment, a UAV and the components for automatically deploying the UAV may be arranged in a container, which can be placed at a desired launch site. Such a container may be "self-sufficient." In other words, it may be installed at a remote location, and left to function on its own for at least some period of time. In other cases, the container may include wired and/or wireless communications systems that allow the container to be partially or wholly controlled by a remote computing system and/or a remote operator. In any event, the container may include sensors and/or systems that are operable to determine when a disaster event has occurred, and to responsively deploy the UAV that is housed in the container.

Figure 6:
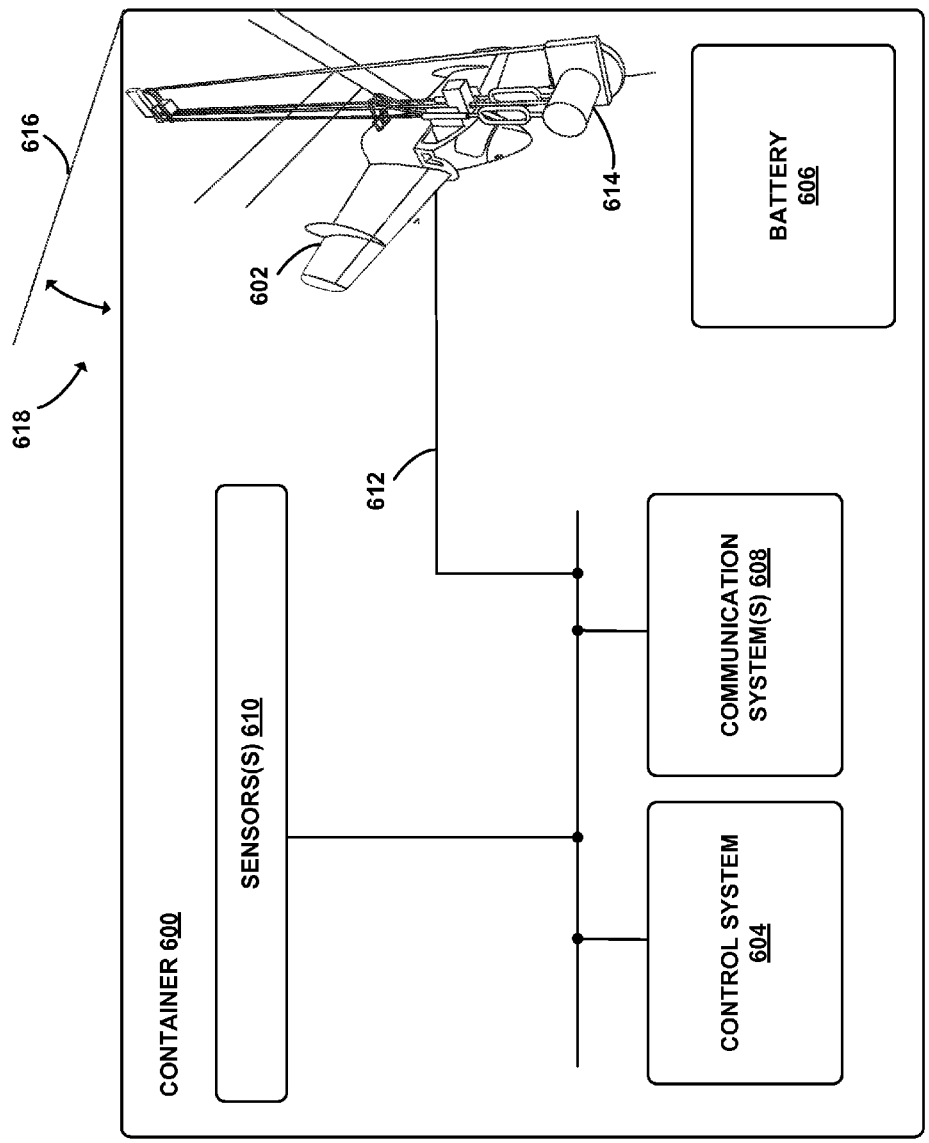
FIG. 6 is a simplified block diagram of an apparatus, according to an example embodiment.

FIG. 6 is a simplified block diagram of an apparatus, according to an example embodiment. The apparatus takes the form of a container 600, which is configured to house a UAV 602. The container 600 further includes a control system 604, a battery 606, one or more communications systems 608, and one or more sensors 610, which are communicatively connected via a data bus 612. Further, container 600 includes a deployment mechanism 614 that is operable to launch the UAV 602.

In the illustrated example, a hatch 616 may be closed to cover an opening 618 in container 600. When hatch 616 is closed, container 600 may fully enclose UAV 602 in the container. Hatch 616 may then be opened in order that UAV 602 may be launched through the opening 618. In other embodiments, the container may not include hatch 616 or another such feature for sealing the container. In such an embodiment, the container may partially enclose the UAV, such that the UAV may be deployed from the container.

The control system 604 may generally control the operation of the container. In an example embodiment, control system 604 may take the form of or include one or more computer systems, which can include non-transitory data storage and one or more processors that are operable to execute program instructions stored in the data storage. For example, the control system 604 may include software and/or firmware to deploy the UAV 602, and operate sensors 610 and/or communication systems 608.

In an example embodiment, the control system 604 is operable to: (i) receive first data corresponding to a first geographic area, (ii) analyze the first data to detect an occurrence of a disaster event at the first geographic area, and (iii) in response to detection of the disaster event: (a) determine, based on second data, whether or not one or more conditions affecting operation of the UAV are conducive to deployment of the UAV for to fly to the first geographic area, (b) if the one or more conditions are not conducive to deployment of the UAV, then deploy the UAV to fly to the first geographic area, and (c) if the one or more conditions are not conducive to deployment of the UAV, then monitor the second data until it is determined that the one or more conditions are conducive to deployment of the UAV, and then deploy the UAV to fly to the first geographic area.

In a further aspect of some embodiments, control system 604 may be configured to generate and/or store log data, diagnostic data, and/or flight data for UAV 602. Such data may be stored locally in data storage in the container 600, and/or may be stored in remotely (e.g., in the cloud). The control system 604 may also be configured to check for software updates and/or to allow for remote updates of its software.

An example container 600 may include various types of communication systems 608. For instance, the container may include a satellite phone uplink, an Internet interface, a cellular network interface, and/or interfaces for other types of data networks, among other possibilities, which allow the container to communicate with remote entities. As an example, such communication systems 608 may allow the container 600 to communicate with remote sensor systems and/or remote data services (e.g., a weather service), and/or to transmit data acquired by UAV 602 during a flight to a remote location where it can be used, e.g., for relief efforts. In some embodiments, such communication systems may allow the UAV to communicate without requiring that the UAV carry long-range satellite communication equipment, which is typically heavy, thus reducing the payload weight and extending the potential flight time of the UAV.

In some embodiments, such network connectivity may allow for control of some or all functions of a container 600 and/or a UAV 602 via another computing device at a remote location. Further, in some embodiments, container 600 may include an integrated ground-station radar system (not shown) that provides air traffic control information to the a ground station. Alternatively, container 600 may connect to a remote radar system to obtain such air traffic control information.

In a further aspect, a container 600 may include one or more systems for communicating with a UAV 602 during flight. For example, container 600 may include a long-range (e.g. up to 70 km) communication system configured for communications with the UAV. Such a long-range communication system may include a long-range directional antenna for RF communications with a UAV 602, as well as a directional tracking mechanism to facilitate the aiming of the directional antenna at the UAV while the UAV is in flight. Other types of communications system for ground-to-air communications with UAV 602 are also possible.

In some embodiments, a container 600 may also include a diagnostics system (not shown) for the UAV 602. Various types of diagnostic systems are possible. The diagnostics system may include, for example: (a) an on-board integrated computer and (b) one or more interfaces for acquiring data from a UAV. Configured as such, the diagnostics system may perform basic diagnostics on the UAV, such as testing motor controllers, propellers, and/or on-board sensors to ascertain whether these components are functioning properly and/or have been damaged. Variations and other types of diagnostics systems are also possible.

An example container 600 may include various types of sensors 610. Such sensors and sensor systems may facilitate detection of one or more types of disaster events, among other possible functionality. For example, container 600 may include one or more anemometers, which are operable to measure wind speed and/or direction at or near the container. Additionally or alternatively, a container 600 may be communicatively coupled to one or more remote anemometers at one or more remote locations. In either case, data from anemometers may be used to detect disaster events such as hurricanes, tropical storms, and/or tornadoes, among other possibilities.

In some embodiments, container 600 may include one or more barometers, and/or may be communicatively coupled to one or more barometers at one or more remote locations. Such barometers may provide atmospheric conditions in the area of the container, and/or at the one or more remote locations. As such, the container's control system 604 may detect changes in atmospheric pressure that are indicative of, e.g., a hurricane or a tropical storm, among other possibilities.

In some embodiments, container 600 may include one or more imaging devices (e.g., still and/or video cameras), and/or may be communicatively coupled to one or more cameras at one or more remote locations. Further, various types of cameras are possible. In some cases, cameras that capture images in the visible spectrum may be employed. Additionally or alternatively, infrared (IR), spectral, and/or thermal cameras may be employed. Image data from such cameras may be analyzed to detect various types of disaster events, such as a forest fire, or an explosion at a building, among other possibilities.

In some embodiments, container 600 may include one or more microphones that are operable to detect sound in the environment surrounding the container. Additionally or alternatively, a container 600 may include interfaces for receiving data from or information based on microphones at remote locations. In either case, data from such microphones may be used to detect, e.g., loud noises that may be indicative of a disaster event. Typically, such microphones will be arranged so as to detect loud noises, such as a gunshot or explosion, but not sounds such as human voices.

Figure 7:
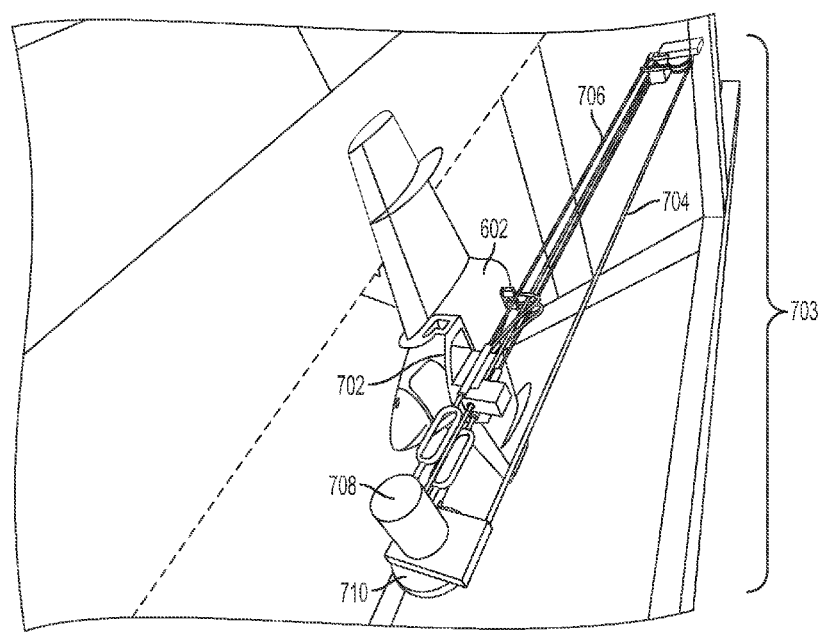
FIG. 7 shows an example deployment system in greater detail.

Various types of deployment systems for launching a UAV 602 are possible. FIG. 7 shows an example deployment system in greater detail. In particular, FIG. 7 shows an interior view of a sled-type deployment system in a launch tube 703. The deployment system (which may also be referred to as a "launch system") includes a UAV attachment feature (e.g., a launch sled 702) within the launch tube 703, which connects the UAV 602 to a launch mechanism. The launch mechanism includes a launch guide (e.g., guide wires or cables 706), a launch cable 704 to which the launch sled 702 is attached, and a motor 708. The motor 708 is operable to launch the UAV 602 by moving the launch cable 704 around a pulley system 710, thus propelling the launch sled 702 and the attached UAV 602 upward through the launch tube 703 such that the UAV that is propelled through an opening at a top end of the launch tube (e.g., through the opening provided when hatch 616 is open). It should be understood that FIG. 7 shows but one example of a UAV deployment mechanism. Other examples are also possible.

UAV 602 may include various types of sensors and sensor systems, including but not limited to those described elsewhere herein. Configured as such, once launched from the container 600, the UAV 602 may obtain and collect various types of data related to a disaster event. For example, UAV 602 may include: (i) one or more imaging devices operable to capture video and/or still images, (ii) one or more imaging devices operable to capture infrared (IR) imagery, which could be analyzed to, e.g., show hotspots or patterns of forest fires), (iii) one or more microphones to capture audio data (including, e.g., directional audio data), (iv) a particular matter detector which could be used to, e.g., detect smoke or ash in the air, and/or (v) a spectral imaging device or a Raman spectrometer, which could provide spectral data that indicates, e.g., what type of material is burning in a fire, among other possibilities. Other examples of sensors and uses for data from sensors are also possible.

In a further aspect, a UAV 602 may include various types of communication systems. For example, UAV 602 may include a satellite phone uplink, an Internet interface, a cellular network interface, and/or interfaces for other types of data networks. Further, one or more of such wireless communications systems may be configured for communications with container 600 (e.g., with control system 604 and/or other systems of the container). UAV 602 may additionally or alternatively include one or more wireless communications systems for communicating data to other remote computing systems. (Note that a UAV 602 may use the same system for air-to-ground communications with container 600 as it uses for communications with other remote computing systems, or may have separate communications systems for each.)

In some embodiments, the UAV 602 may have one or more pre-programmed flight paths stored in data storage within the UAV, or within memory in container 600, such that a pre-programmed flight path can be quickly loaded to the UAV in response to a disaster event. In some cases, UAV 602 could be pre-programmed with a flight path that returns the UAV to its container 600 after collecting data. Then, when UAV 602 returns to container 600, the UAV may connect to communication systems and transmit the data it has collected to appropriate recipients, or provide its collected data to a communication system 608 for transmission to a remote facility. Note that the transmission of data upon return to the container 600 may only occur if the UAV 602 has not been already transmitted the data while in flight. Alternatively, data may be re-transmitted upon returning in order to provide redundancy.

In some embodiments, after collecting data related to a disaster event, the UAV 602 may be pre-programmed to fly to a different return location (e.g., other than the container 600 from which the UAV launched). For instance, the UAV could fly to a police station, a rescue coordination center, or a location where it could be easily collected, among other possibilities. In some cases, the UAV 602 may be configured to return to the container 600 so long as communication channels are available to send the data that the UAV has collected, and to fly to an alternate return location (e.g., where it can be more easily collected) if such communications channels are unavailable.

In a further aspect, UAV 602 may include a self-deployable parachute. Such parachute may be deployed automatically in response to, e.g., a low or completely discharged battery and/or other events.

IV. Illustrative Methods

Example methods described herein may be implemented by a container (e.g., by a control system within the container and/or by other systems in the container), such as container 600 shown in FIG. 6. However, example methods or portions thereof may also be implemented by other entities, without departing from the scope of the invention. Further, while example methods may be described by way of example as being carried out by a control system (e.g., such as control system 604), it should be understood that some or all of the described functionality may also be carried out by other entities or combinations of entities.

Figure 8:
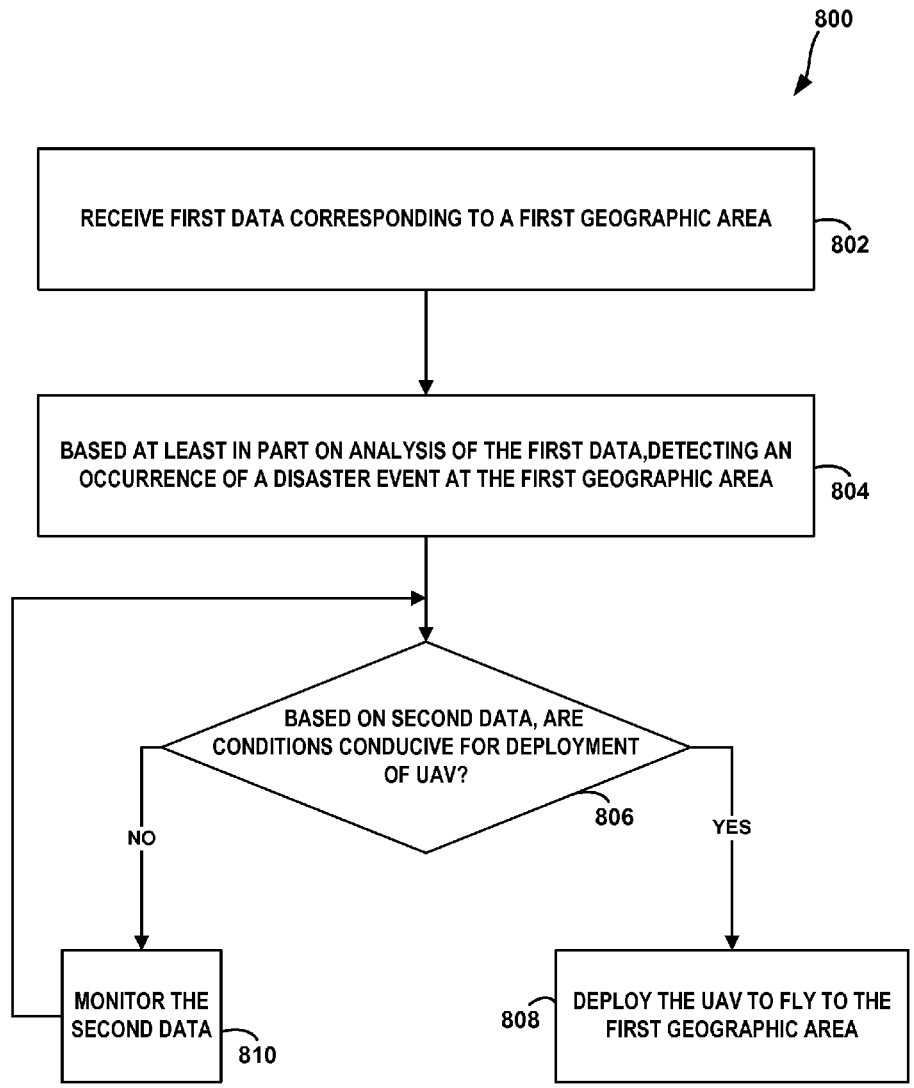
FIG. 8 is a flow chart illustrating a method, according to an example embodiment.

FIG. 8 is a flow chart illustrating a method 800, according to an example embodiment. As shown by block 802, method 800 involves a control system receiving first data corresponding to a first geographic area. The data may be, for example, sensor data that can provide information that is indicative of one or more types of disaster events. Based at least in part on analysis of the first data, the control system detects an occurrence of a disaster event at the first geographic area, as shown by block 804. Then, in response to detection of the disaster event, the control system determines, determining, based on second data, whether or not one or more conditions affecting operation of a UAV are conducive to deployment of the UAV to fly to the first geographic area, as shown by block 806.

If the one or more conditions are conducive to deployment of the UAV, then the control system deploys the UAV to fly to the first geographic area, as shown by block 808. On the other hand, if the one or more conditions are not conducive to deployment of the UAV, then the control system monitors the second data until it is determined that the one or more conditions are conducive to deployment of the UAV, as shown by block 810. At a later time, when it is determined that condition are appropriate, the control system deploys the UAV to fly to the first geographic area.

An example method may be implemented to detect various types of disaster events. For example, block 804 may involve detecting a hurricane, a tornado, a tropical storm, an earthquake, or a tsunami, among other possibilities.

At block 802, the function of receiving data could involve the container's control system receiving data from a sensor or systems at a remote location, or could simply involve the container's control system receiving data from its own sensors and/or its own systems. Further, at blocks 802 and 804, various types of data may be received and analyzed.

Note that in a further aspect, the control system may set some time-out period, at which point the control system will no longer wait for conditions to be conducive to deploy the UAV, and may terminate method 800. When the time-out period expires various actions may be taken. For example, the control system may launch the UAV, refrain from launching the UAV, send a notification to another computing system, and/or take other actions.

A. Detecting a Disaster Event

At block 804, detection of a disaster event may be accomplished using various techniques. For example, a container's control system may detect high wind speeds in a particular geographic area, which are indicative of a disaster event such as a hurricane, tropical storm, or tornado.

Various techniques may be used to detect the occurrence of a disaster event associated with high wind speed. For instance, at block 802, the container may receive and/or measure wind data corresponding to the first geographic area. Such wind data may indicate wind speed and/or direction. As such, block 804 may involve the container's control system comparing the wind speed in the first geographic area to a threshold wind speed. For example, the control system may determine that the measured wind speed in the geographic area is above a threshold speed; possibly requiring that the wind speed remain above the threshold for at least some predetermined period of time, before deeming the high wind speed to be indicative of a disaster event. Alternatively, the container might detect when the average wind speed (e.g., calculated over some predetermined period), is above a threshold for the average wind speed. Other examples and variations are also possible.

Example UAV deployment containers may also be operable to detect and launch UAVs in response to other types of disaster events, in addition or in the alternative to disaster events that are associated with high wind speed. For instance, a container's control system may be configured to detect an earthquake. To do so, the container may include a seismograph, and/or be communicatively coupled to a seismograph at a remote location. As such, the container may detect an earthquake at block 804, and may automatically deploy a UAV. As an example, the UAV may be deployed in response to seismographic data indicating an earthquake of greater than a threshold magnitude (e.g., greater than 6.0 on the Richter scale).

In some embodiments, the control system may receive image data of at least a portion of the first geographic area (e.g., at block 802). As such, block 804 may involve the control system: (a) analyzing the image data for one or more indications of the disaster event, and (b) detecting, in the image data, at least one of the one or more indications of the disaster event. For instance, the collapse of a building could be detected through analysis of images that are taken of the building's location and/or through analysis of audio data captured near the building's location. A UAV could then be automatically deployed to capture aerial image data and/or to collect other types of data related to the collapsed building.

Image data received at block 802 may be, e.g., a sequence of periodically captured still images, or a video feed. Further, such image data may include aerial image data and/or image data captured at or near to ground level. Further, the control system may receive image data capturing electromagnetic radiation in the visible spectrum, IR image data, spectral image data, and/or other types of image data.

In some embodiments, the control system may receive audio data corresponding to at least a portion of the first geographic area. As such, block 804 may involve the control system: (a) analyzing the audio data for one or more indications of the disaster event, and (b) detecting, in the audio data, at least one of the one or more indications of the disaster event. Such indications may include loud noises or other sounds that are characteristic of a particular type of disaster event. For example, block 804 may involve the control system determining that an audio trigger event has occurred when sound having a volume (e.g., dB level) above a threshold is detected. Other examples are also possible.

In some embodiments, block 804 may involve the container's control system detecting an abnormal data pattern in data that corresponds to the first geographic area. For example, at block 802, the control system may receive data indicating ground-level light intensity in the first geographic area, and wherein detecting the abnormal data pattern comprises detecting an abnormal change in ground-level light intensity. As a specific example, a low ground-level light intensity may be considered an indicator of volcanic eruption, since ash from an eruption may block out the sun. Other examples are also possible.

As another example, the function of detecting an abnormal data pattern may involve analyzing data that indicates levels of particulate matter in the first geographic area, and detecting an abnormal level or an abnormal change in the level of particulate in the air. For example, such data could be used to detect smoke in the air, and high levels may be interpreted as being indicative of a building fire or forest fire. Other examples are also possible. In response to detecting a fire, the container may initiate a process to automatically deploy its UAV, such as that illustrated in FIG. 8. Then, during flight, the UAV may capture aerial image data and/or collect other types of data from the area where the fire is detected (e.g., data indicating the amount of smoke in the air, temperature data, wind data, etc.).

As yet another example, the container may receive data indicating usage levels of one or more data networks in the first geographic area, at block 802. In such an embodiment, the container's control system may interpret an abnormal level of network usage in the first geographic area as an indication of a disaster event. For example, if the traffic on a cellular network drops dramatically, this may indicate a network outage, which could be the result of a disaster event. Conversely, if traffic on a cellular network increases dramatically, this could also be interpreted as an indication of a disaster event; e.g., due to a large number of people using cell phones to call for help.

And, as yet another example, the container may receive data indicating the level of social network activity originating from the first geographic area and/or referencing the first geographic area. In such an embodiment, the container's control system may consider an abnormally high level of social network activity originating from and/or referencing the first geographic area to be an abnormal data pattern that can be indicative of a disaster event in the area. For example, if a large number posts to a social network include content (e.g., text or images) related to the first geographic area, or if the number of posts with content related to the area increases dramatically from a normal level, this may indicate that a major event (such as a disaster event) is occurring in the area.

Further, the level of social network activity may be evaluated in the context of social network activity that includes content relating to the first geographic area. For example, a container, or a remote system in communication with the container, could analyze text and/or images from posts to a social network (although, only with permission of the users that submit such posts). Such text and/or images could then be analyzed for indications that a disaster event is occurring in the geographic area.

In a further aspect, the abnormality of a data pattern may be determined based on the context in which the data pattern is detected. For example, a ground-level light intensity may naturally vary during the course of the day. Thus, ground-level light intensity may be interpreted in light of the normal level for the particular time of day. As a specific example, a low ground-level light intensity may be considered abnormal during the daytime, but not during the night. Other examples are also possible.

B. Waiting Until Conditions are Appropriate to Launch a UAV

In an example embodiment, blocks 806 to 810 may be implemented by the container's control system in order to wait until conditions are appropriate before automatically deploying the UAV from the container. Further, note that if a UAV is not located in the area being affected by the disaster event, conditions affecting flight may exist in geographic areas beyond just the area affected by the disaster event. As such, such conditions may be analyzed in "a potential flight-path area" for the UAV at blocks 806 to 810.

Figure 9:
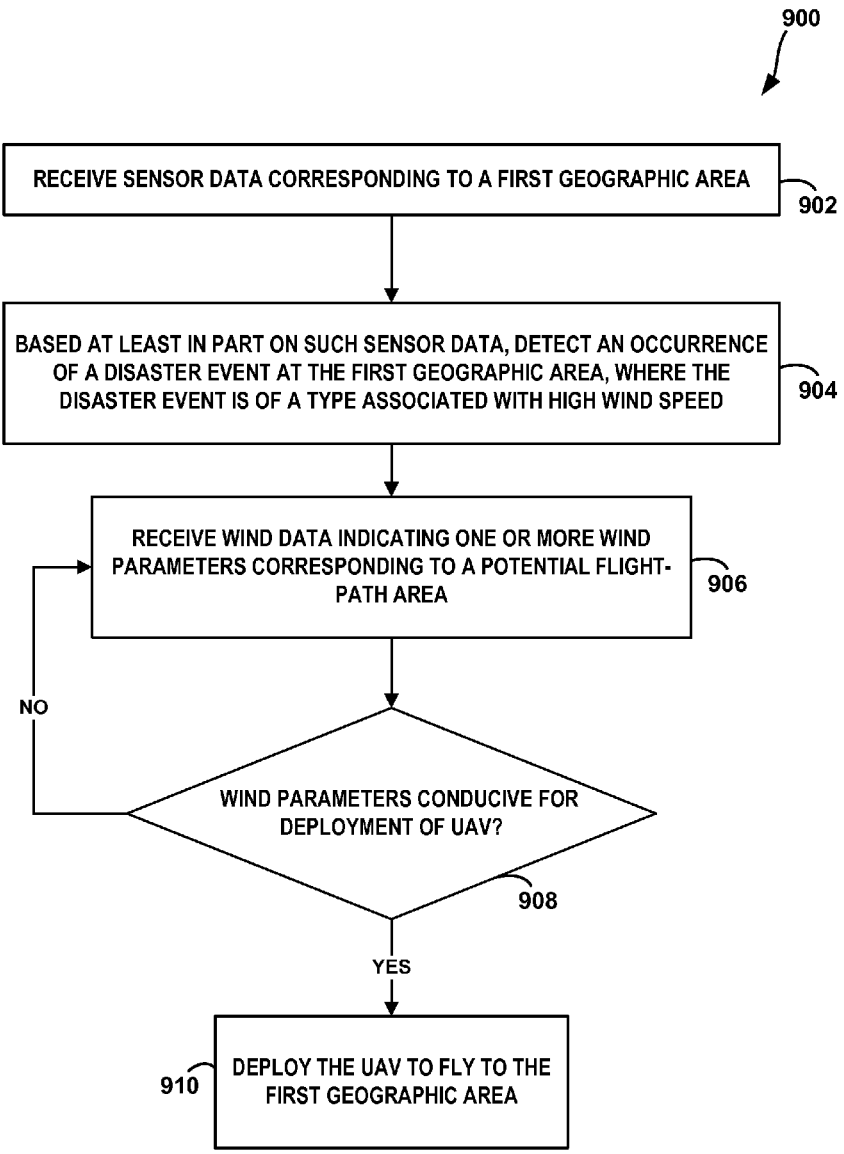
FIG. 9 is a flow chart illustrating a method in which a container waits for appropriate wind conditions before deploying a UAV to the area of a disaster event, according to an example embodiment.

For example, FIG. 9 is a flow chart illustrating a method 900 in which a container waits for appropriate wind conditions, before deploying a UAV to the area of a disaster event, according to an example embodiment.

As shown by block 902, method 900 involves the control system receiving sensor data corresponding to a first geographic area. As an example, an example system may determine or receive data indicating wind speed. The wind-speed data can then be analyzed to detect, e.g., that a hurricane, a tornado, a tropical storm, or a tsunami is occurring or has occurred, among other possibilities. Then, based at least in part on such sensor data, the control system detects an occurrence of a disaster event at the first geographic area, where the disaster event is of a type associated with high wind speed, as shown by block 904.

At block 904, other types of data may also be analyzed in order to detect a disaster event associated with high wind speed. For example, the control system may be configured to detect a change in atmospheric pressure at the first geographic area; e.g., as measured by a barometer, which could be indicative of a hurricane or tropical storm. Other examples are also possible.

Once a high-wind-speed disaster event is detected, method 900 may involve analyzing additional wind data to detect when winds have subsided enough that deploying the UAV is feasible. More specifically, in response to detecting a disaster event, the control system may receive wind data indicating one or more wind parameters corresponding to a potential flight-path area, as shown by block 906. The control system may then determine whether or not the one or more wind parameters are conducive to deployment of the UAV to fly to the first geographic area, as shown by block 908.

If the one or more wind parameters are not conducive to deployment of the UAV, then the control system may monitor wind data for the potential flight-path area (e.g., by repeating block 906 and 908), until it is determined that the one or more wind parameters are conducive to deployment of the UAV to fly to the first geographic area. As soon the system determines that wind speed has subsided, the system may automatically deploy the UAV to fly to the first geographic area. More specifically, if the one or more wind parameters are conducive to deployment of the UAV, then the control system may deploy the UAV to fly to the first geographic area, as shown by block 910.

Referring back to method 800, other types of conditions affecting operation of a UAV may be evaluated at blocks 806 to 810, in addition or in the alternative to wind speed. As another example, precipitation such as rain, sleet, or snow may be undesirable for UAV flight. Accordingly, after detecting a disaster event, such as a tropical storm, an example UAV deployment container may monitor rain that accompanies the tropical storm, and wait for rain to subside before deploying its UAV.

In yet another example, fog or smoke may be undesirable for data collection by a UAV (e.g., by preventing the UAV from capturing aerial images over a disaster area). Accordingly, after detecting a disaster event, such as a forest fire or an earthquake, an example UAV deployment container may monitor, e.g., the amount of particulate and/or moisture in the air, light intensity levels, and/or other data that is indicative of fog, smoke, or haze. If such data indicates that there is insufficient visibility for aerial imaging, then the container may wait for fog or smoke to subside to a point where aerial imaging is feasible, before deploying its UAV. Other examples of conditions affecting flight by a UAV are also possible.

D. Other Aspects

In a further aspect, when a disaster event is detected, the container could send an alert to a human, in conjunction with launching the UAV, or possibly before the UAV is deployed. The alert could include, e.g., data that was used to detect the event and/or other information.

Further, in some cases, the container may condition launch of the UAV (or in other words, condition blocks 806 to 810) on confirmation by a remote human operator or a remote computing system. Accordingly, the alert that the container sends upon detecting a disaster event may include a request for a human operator to confirm or override the automated deployment of the UAV from the container.

In another aspect, a UAV deployment container may be configured to detect and distinguish between multiple types of disaster events that are associated with high wind speed In yet another aspect, when a container is configured to detect multiple types of disaster events, its control system may be configured to dynamically program and/or operate the UAV according to the particular type of disaster event that is detected. For example, the flight path and/or type of data that is collected by the UAV may vary depending according to the particular type of disaster event that is detected. Other examples are also possible.

V. Conclusion

While various aspects of the disclosure have been disclosed herein, other aspects and embodiments will be apparent to those skilled in the art. Accordingly, the embodiments disclosed herein are for purposes of illustration, and are not intended to be limiting, with the true scope and spirit of the disclosure being indicated by the following claims.

What is claimed is:

1. A computer-implemented method comprising:
    receiving, by a control system comprising a processor, first data corresponding to a first geographic area;
    based at least in part on analysis of the first data, detecting, by the processor an occurrence of a disaster event at the first geographic area; and
    in response to detection of the disaster event, the processor:
        determining, based on second data, whether or not one or more weather conditions affecting operation of an unmanned aerial vehicle (UAV) are conducive to deployment of the UAV to fly to the first geographic area;
        when the one or more conditions are conducive to deployment of the UAV, then deploying the UAV to fly to the first geographic area; and
        when the one or more conditions are not conducive to deployment of the UAV, then monitoring the second data until it is determined that the one or more conditions are conducive to deployment of the UAV, and then deploying the UAV to fly to the first geographic area,
    wherein the UAV is deployed automatically via a computer-automated deployment system.

2. The method of claim 1, wherein the first data comprises image data of at least a portion of the first geographic area, and wherein detecting the disaster event comprises:
    analyzing the image data for one or more indications of the disaster event; and
    detecting, in the image data, at least one of the one or more indications of the disaster event.

3. The method of claim 1, wherein the first data comprises audio data corresponding to at least a portion of the first geographic area, and wherein detecting the disaster event comprises:
    analyzing the audio data for one or more indications of the disaster event; and detecting, in the audio data, at least one of the one or more indications of the disaster event.

4. The method of claim 1, wherein detecting the disaster event comprises detecting an abnormal data pattern in the first data.

5. The method of claim 4, wherein the first data comprises data indicating ground-level light intensity in the first geographic area, and wherein detecting the abnormal data pattern comprises detecting an abnormal change in ground-level light intensity.

6. The method of claim 4, wherein the first data comprises data indicating levels of particulate matter in the air in first geographic area, and wherein detecting the abnormal data pattern comprises data indicating particulate matter in the first geographic area, detecting an abnormal change in the level of particulate matter in the air.

7. The method of claim 4, wherein the first data comprises data indicating use of one or more data networks in the first geographic area, and wherein detecting the abnormal data pattern comprises detecting an abnormal level of network usage in the first geographic area.

8. The method of claim 4, wherein the first data comprises data indicating social network activity originating from the first geographic area, and wherein detecting the abnormal data pattern comprises detecting an abnormal level of social network activity originating from the first geographic area.

9. The method of claim 1, wherein determining whether or not the one or more weather conditions affecting operation of the UAV are conducive to deployment of the UAV comprises:
determining whether or not wind speed in the first geographic area is above a threshold.

10. The method of claim 1, wherein determining whether or not the one or more weather conditions affecting operation of the UAV are conducive to deployment of the UAV comprises:
determining whether or not precipitation in the first geographic area is conducive to deployment of the UAV.

11. A computer-implemented method comprising:
receiving, at a control system for an unmanned-aerial-vehicle (UAV) deployment system, sensor data corresponding to a first geographic area, wherein the sensor data comprises first wind data, and wherein the control system comprises a processor;
based at least in part on the sensor data, detecting, by the processor, a disaster event at the first geographic area, wherein the disaster event is of a type associated with high wind speed; and
in response to detecting the disaster event, the processor:
(a) receiving second wind data corresponding to at least one potential flight path to the first geographic area;
(b) determining, based at least in part on the second wind data, whether or not weather conditions associated with the at least one potential flight path are conducive to deployment of the UAV to fly to the first geographic area;
(c) when the weather conditions are conducive to deployment of the UAV, then deploying the UAV to fly to the first geographic area; and
(d) when the weather conditions are not conducive to deployment of the UAV, then monitoring the second wind data until it is determined that the one or more wind parameters are conducive to deployment of the UAV to fly to the first geographic area, and then deploying the UAV to fly to the first geographic area, wherein the UAV is deployed automatically via a computer-automated deployment system.

12. The method of claim 11, wherein the disaster event comprises one of a hurricane, a tornado, a tropical storm, and a tsunami.

13. The method of claim 11, wherein the first wind data comprises information regarding wind speed in the first geographic area, and wherein detecting the disaster event at the first geographic area comprises:
comparing the wind speed in the first geographic area to a threshold; and
determining that the wind speed in the first geographic area is above the threshold.

14. The method of claim 11, wherein the sensor data further comprises data indicating atmospheric pressure in the first geographic area, and wherein detecting the disaster event further comprises: detecting at least a threshold change in the atmospheric pressure in the first geographic area.

15. The method of claim 11, wherein monitoring the second wind data until it is determined that the one or more wind parameters are conducive to deployment of the UAV to fly to the first geographic area comprises waiting until the wind speed in the geographic area is below a second threshold.

16. The method of claim 11, wherein determining, based at least in part on the second wind data, whether or not weather conditions associated with the at least one potential flight path are conducive to deployment of the UAV comprises:
using wind data for one or more locations on the at least one potential flight path to determine whether or not weather conditions associated with the at least one potential flight path are conducive to deployment of the UAV, wherein at least one of the one or more locations is a location other than a deployment location.

17. An apparatus comprising:
an unmanned aerial vehicle;
a container configured to at least partially enclose the unmanned aerial vehicle; and
a control system comprising a processor, wherein the control system is operable to:
receive sensor data corresponding to a first geographic area;
based at least in part on the sensor data, detect an occurrence of a disaster event at the first geographic area, wherein the disaster event is of a type associated with high wind speed; and
in response to detection of the disaster event:
(a) receive wind data indicating one or more wind parameters corresponding to a potential flight-path area to the first geographic area;
(b) determine whether or not the one or more wind parameters are conducive to deployment of the UAV to fly to the first geographic area;
(c) when the one or more wind parameters are conducive to deployment of the UAV, then automatically deploy the UAV to fly to the first geographic area; and
(d) when the one or more wind parameters are not conducive to deployment of the UAV, then monitor the wind data until it is determined that the one or more wind parameters are conducive to deployment of the UAV to fly to the first geographic area, and then automatically deploy the UAV to fly to the first geographic area.

18. The apparatus of claim 17, wherein the disaster event comprises one or more of a forest fire, a hurricane, a tornado, a tropical storm, and a tsunami.

19. The apparatus of claim 17, wherein the first wind data comprises information regarding wind speed in the first geographic area, and wherein detection of the disaster event at the first geographic area comprises:
- a comparison of the wind speed in the first geographic area to a threshold; and
- a determination that the wind speed in the first geographic area is above the threshold.

20. The apparatus of claim 17, wherein the apparatus further comprises one or more anemometers, and wherein the sensor data comprises data comprises data from the one or more anemometers.

21. The apparatus of claim 17, wherein the apparatus further comprises a barometer, and wherein the sensor data comprises data from the barometer.

* * * * *